US 6,712,642 B2

(12) United States Patent
Bluhm et al.

(10) Patent No.: US 6,712,642 B2
(45) Date of Patent: Mar. 30, 2004

(54) ELECTRONIC IGNITION DEVICE

(75) Inventors: Thomas K. Bluhm, Willowick, OH (US); John E. Giarrizzo, Macedonia, OH (US)

(73) Assignee: Channel Products, Inc., Chesterland, OH (US)

( * ) Notice: Subject to any disclaimer, the term of this patent is extended or adjusted under 35 U.S.C. 154(b) by 0 days.

(21) Appl. No.: 10/062,244

(22) Filed: Feb. 1, 2002

(65) Prior Publication Data

US 2003/0148655 A1 Aug. 7, 2003

(51) Int. Cl.[7] .................................................. H01R 3/00
(52) U.S. Cl. ...................................................... 439/500
(58) Field of Search ................................ 439/500, 620, 439/621, 622

(56) References Cited

U.S. PATENT DOCUMENTS 4,750,095 A * 6/1988 Huang ......................... 362/190
5,186,652 A * 2/1993 Hai-Yung .................... 439/500

* cited by examiner

Primary Examiner—Tho D. Ta
(74) Attorney, Agent, or Firm—James A. Hudak

(57) ABSTRACT

An electronic ignition device for a gas grill is disclosed. The ignition device comprises a housing having a recess therein for the receipt of the battery and a cap with a rotatable clip therein to hold the old battery during the removal process from the recess and to hold the new battery during the insertion process into the recess. The clip and battery remain substantially stationary within the housing of the electronic ignition device as the cap is threadably received thereon. The terminals on the battery engage electrical contacts within the housing of the electronic ignition device after the battery has been inserted therein. An O-ring is provided between the cap and the housing to provide a seal therebetween protecting the electronic ignition device from the outside environment.

6 Claims, 5 Drawing Sheets

ELECTRONIC IGNITION DEVICE

TECHNICAL FIELD

The present invention relates, in general, to an electronic ignition device and, more particularly, to an electronic ignition device wherein its battery power source can be readily and easily changed.

BACKGROUND ART

Electronic ignition devices powered by a 9 volt battery or a battery having a non-cylindrical configuration are utilized on gas grills in order to ignite the burners contained within the grill. These electronic ignition devices are usually mounted on the underside of the grill and are not visible unless one looks under the grill. The battery power source for these electronic ignition devices is usually received within a recess provided within the device. The depth of the recess is such that only a very small portion of the battery protrudes outwardly from the ignition device. Since the electronic ignition device is mounted on the underside of the gas grill and is not visible unless one looks under the grill, battery replacement is a difficult task since the person replacing the battery has to go under the grill and grip the end of the battery that is protruding from the recess in order to remove same. Unfortunately, the portion of the battery that is protruding from the recess is quite small thus making the gripping of same difficult. Usually, the person removing the battery has to use some type of gripping device, such as a pair of pliers, to grip the end of the battery to remove same. After the person removes the battery from the recess, a new battery must be inserted into the recess. Since the recess is "blind", the polarity of the terminals within the recess is difficult to determine. Therefore, the person inserting the new battery into the recess has no way of determining whether the orientation of the new battery is correct for polarity purposes. Thus, there is a significant chance that the new battery will be inserted into the recess with the improper polarity requiring the battery to be removed and reoriented before being reinserted into the recess. All in all, the replacement of a battery in the present prior art electronic ignition devices utilized on gas grills is a very cumbersome, frustrating and time consuming process. In addition, since a portion of the battery in presently available electronic ignition devices protrudes outwardly therefrom, these ignition devices are not sealed to the environment.

In view of the foregoing, it has become desirable to develop an electronic ignition device that is mounted on the underside of a gas grill and in which the battery power source for same can be easily removed and replaced without any concern as to the polarity of the battery, and which is sealed to the environment.

SUMMARY OF THE INVENTION

The present invention solves the problems associated with prior art electronic ignition devices and other problems by providing an electronic ignition device that mounts on the underside of a gas grill and in which the battery power source for same can be readily replaced without the use of tools and wherein the polarity of the replacement battery is of no concern. The electronic ignition device of the present invention is comprised of a housing having a recess therein for the receipt of the battery and a cap having a rotatable clip therein to hold the old battery during the removal process from the recess and to hold the new battery during the insertion process into the recess. The cap has female threads provided therein which mate with male threads on the housing of the electronic ignition device. The clip and battery remain substantially stationary within the housing of electronic device as the cap member is threadably received thereon. The terminals on the battery contact electrical contacts within the housing of the electronic ignition device after the battery has been inserted therein. The electronic ignition device contains electrical circuitry to compensate for the polarity of the battery. In this manner, the polarity of the battery is of no concern when the battery is inserted into the housing of the ignition device. An O-ring is provided between the cap and the housing to provide a seal between same.

DESCRIPTION OF THE PREFERRED EMBODIMENT

Figure 1:
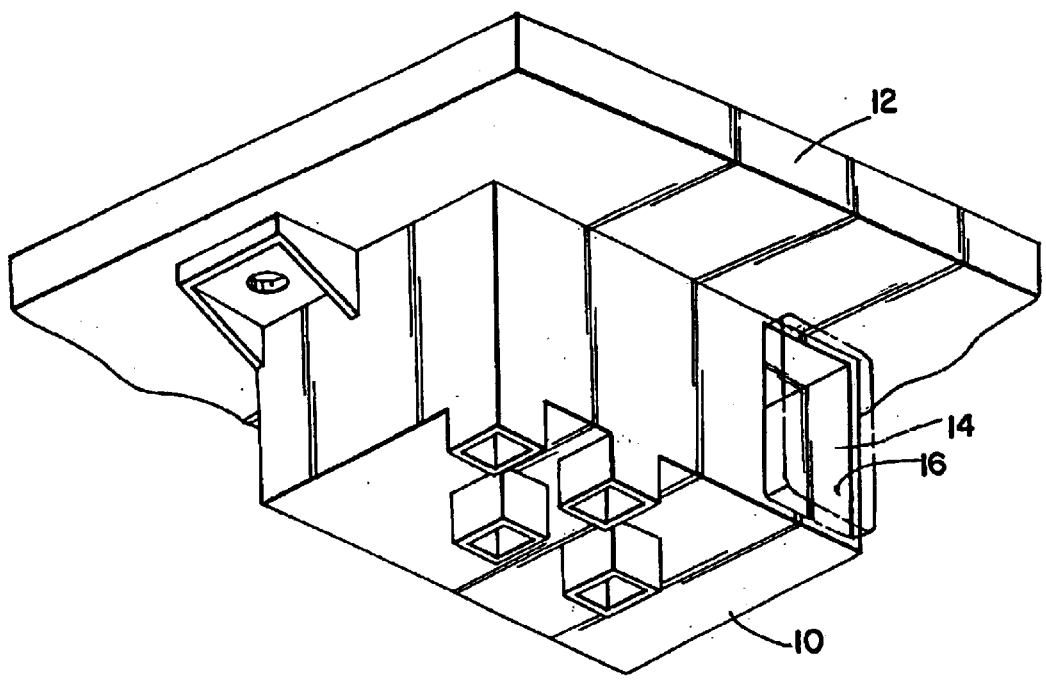
FIG. 1 is a perspective view of a prior art 9 volt electronic ignition device showing the mounting of same on the underside of the gas grill and also illustrating the protrusion of the end of the battery powering same from a recess within the ignition device.

Referring now to the drawings where the illustrations are for the purpose of describing the preferred embodiment of the present invention and are not intended to limit the scope of the invention described herein, FIG. 1 is a perspective view of a prior art 9 volt electronic ignition device 10 which can be utilized for igniting the burner within a gas grill. The ignition device 10 is typically mounted on the underside of a plate 12 which forms a part of the gas grill. The ignition device 10 is powered by a 9 volt battery 14 which is received within a recess 16 provided within the housing of the ignition device 10. Typically, only a very small portion, approximately one-fourth inch, of the body of the battery 14 protrudes outwardly from the recess 16. Since only a very small portion of the battery 14 is available for gripping purposes, it is difficult to remove and replace same. In addition, removal and replacement of the battery 14 is made more difficult since the ignition device 10 is mounted on the underside of the plate 12, and thus, is hidden from view. Furthermore, in order to replace the battery 14, the polarity of the terminals on the new battery must "match" the polarity of the terminals contained within the recess 16 in the ignition device 10. It is difficult to determine the polarity of the terminals contained within the recess 16 since they are not readily visible. In addition, since a small portion of the battery 14 protrudes outwardly from the ignition device 10, the device 10 is not sealed to the environment.

Figure 2:
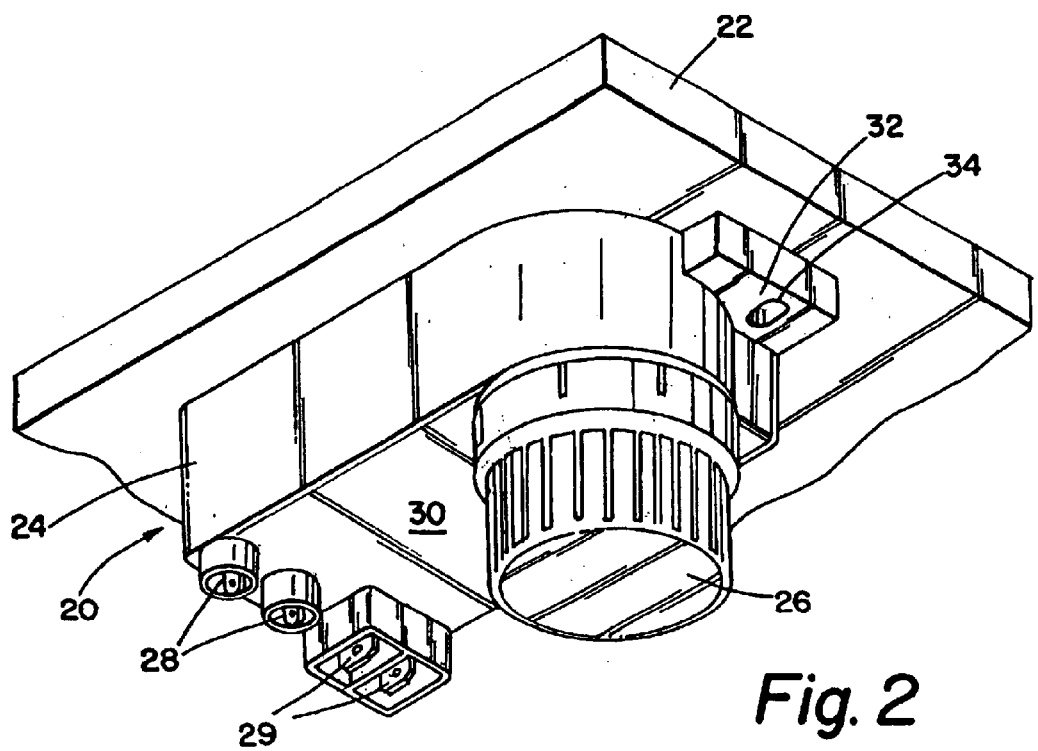
FIG. 2 is a perspective view of the 9 volt electronic ignition device of the present invention showing the mounting of same on the underside of a gas grill.
Figure 3:
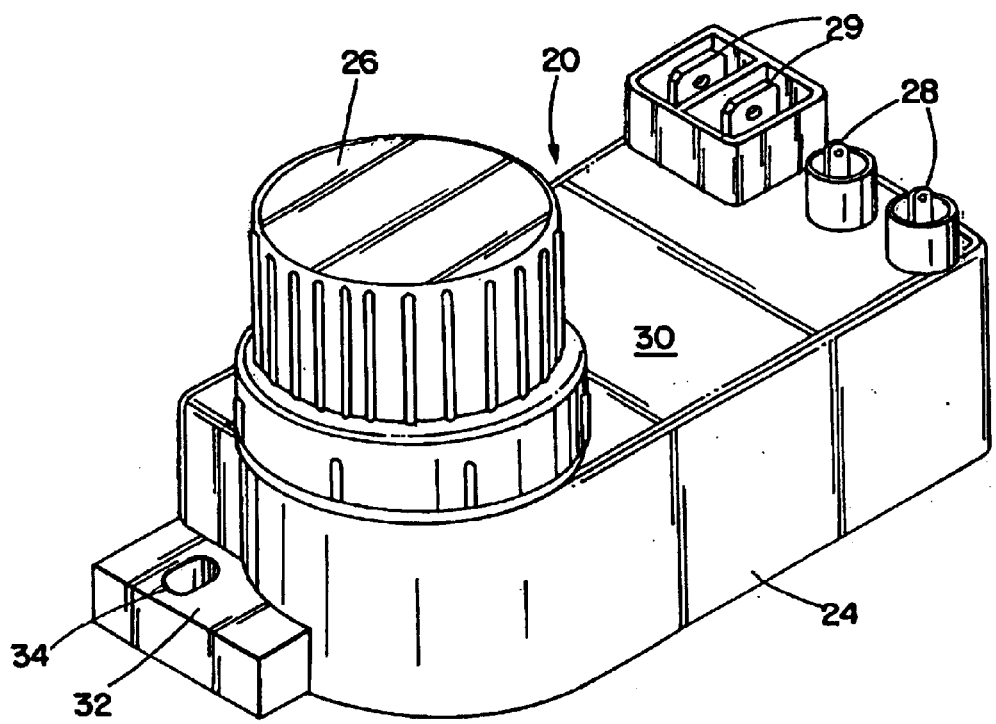
FIG. 3 is another perspective of the electronic ignition device of the present invention.
Figure 4:
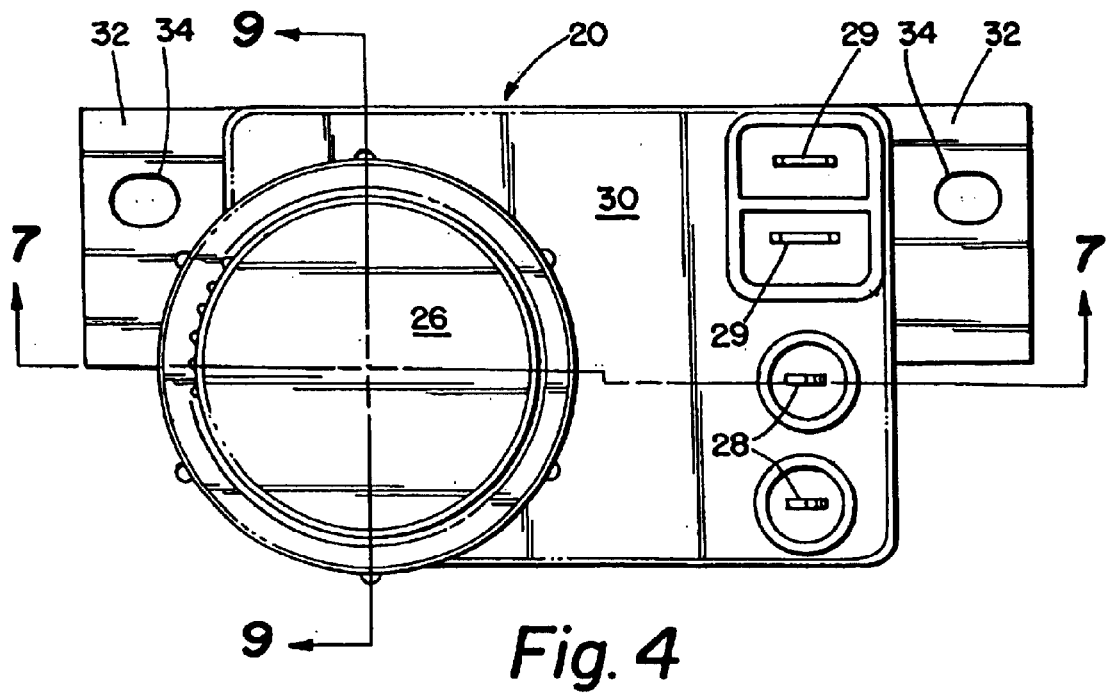
FIG. 4 is a top plan view of the electronic ignition device of the present invention.
Figure 5:
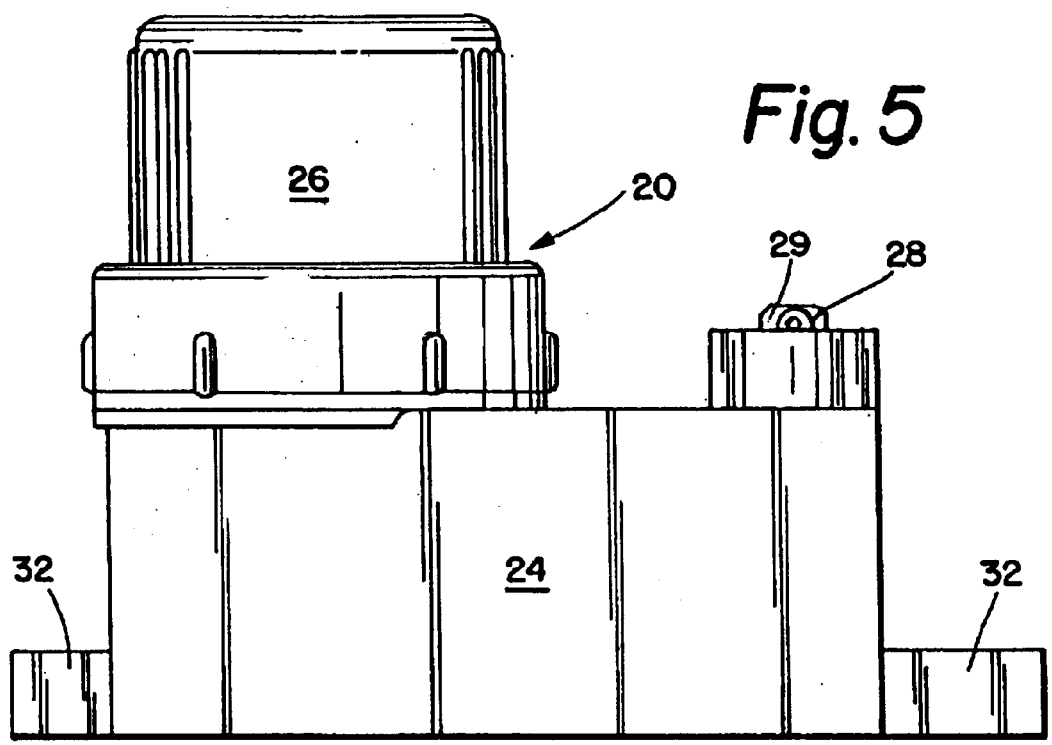
FIG. 5 is a front elevational view of the electronic ignition device of the present invention.
Figure 6:
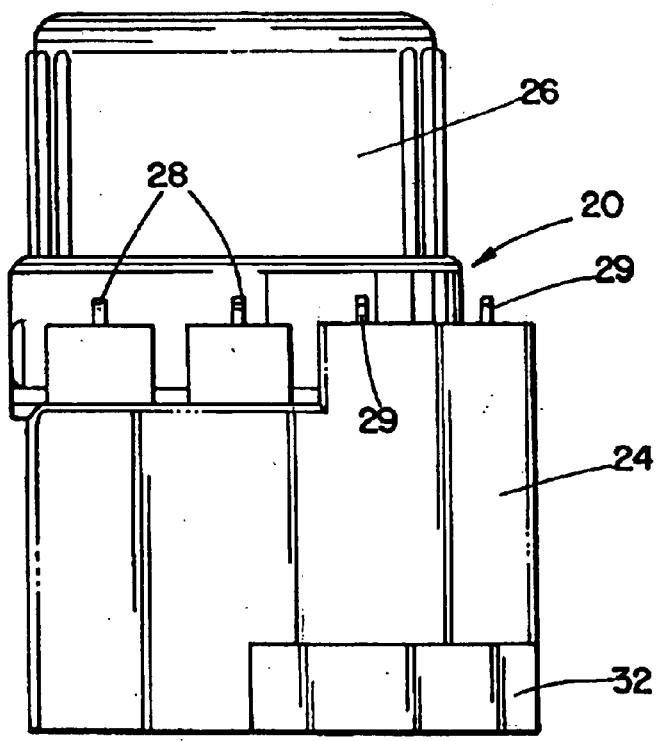
FIG. 6 is a right end elevational view of the electronic ignition device of the present invention.

Referring now to FIG. 2, a perspective view of the 9 volt electronic ignition device 20 of the present invention is illustrated. As in the prior art, the ignition device 20 is mounted on the underside of a plate 22 which forms a part of the gas grill that utilizes the ignition device 20 for spark ignition purposes. The ignition device 20 is comprised of a housing 24 and a cap 26, as shown in FIG. 3. The housing 24 has a plurality of high voltage electrodes 28 which protrude from the top surface 30 thereof to provide the necessary ignition spark to the gas grill. A plurality of switch terminals 29 which protrude from the top surface 30 of the housing 24 is also provided. In addition, oppositely disposed ears 32, as shown in FIGS. 4 and 5, are integrally attached to the housing 24 for mounting purposes. An aperture 34 is provided in each of the ears 32 permitting the receipt of a fastener (not shown) therethrough allowing the ignition device 20 to be mounted on the underside of plate 22.

Figure 7:
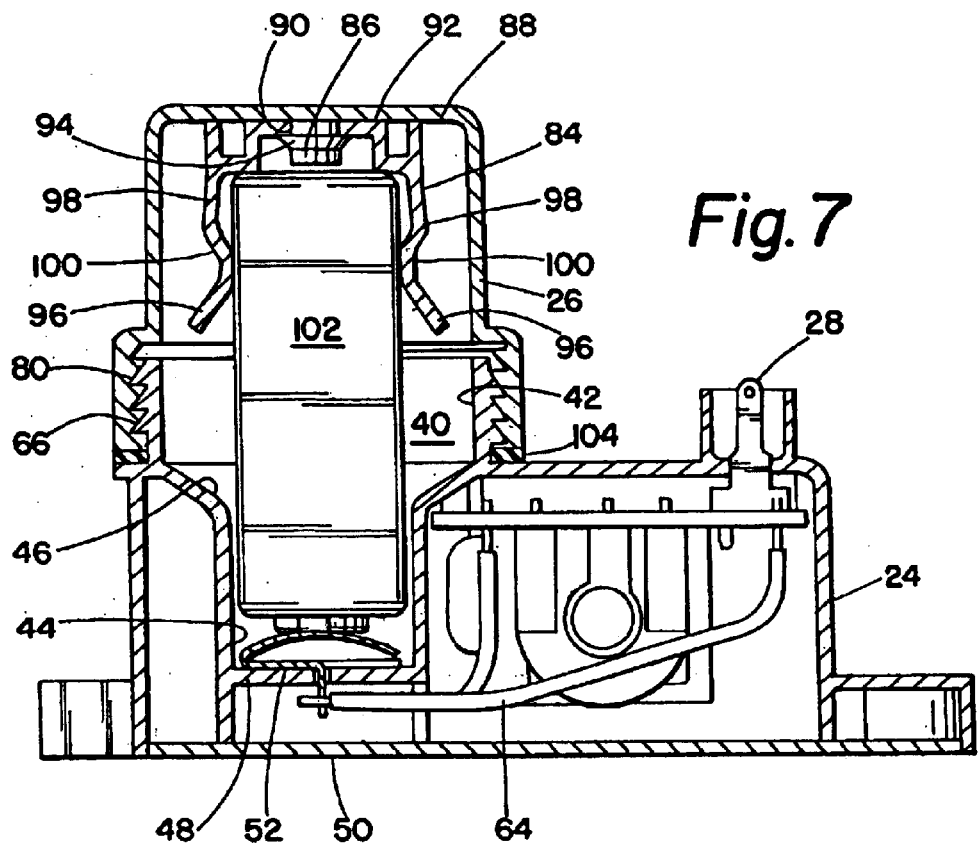
FIG. 7 is a cross-sectional view of the electronic ignition device of the present invention taken across section-indicating lines 7—7 in FIG. 4.
Figure 8:
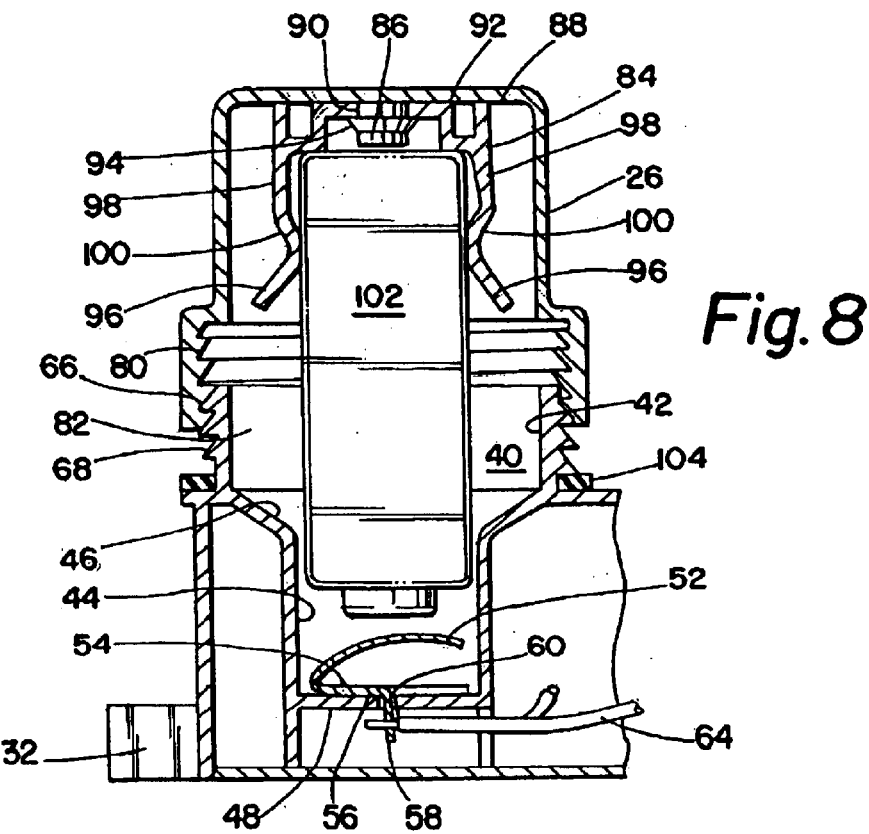
FIG. 8 is a partial cross-sectional view, similar to FIG. 7, showing the battery being inserted into the recess in the housing.
Figure 9:
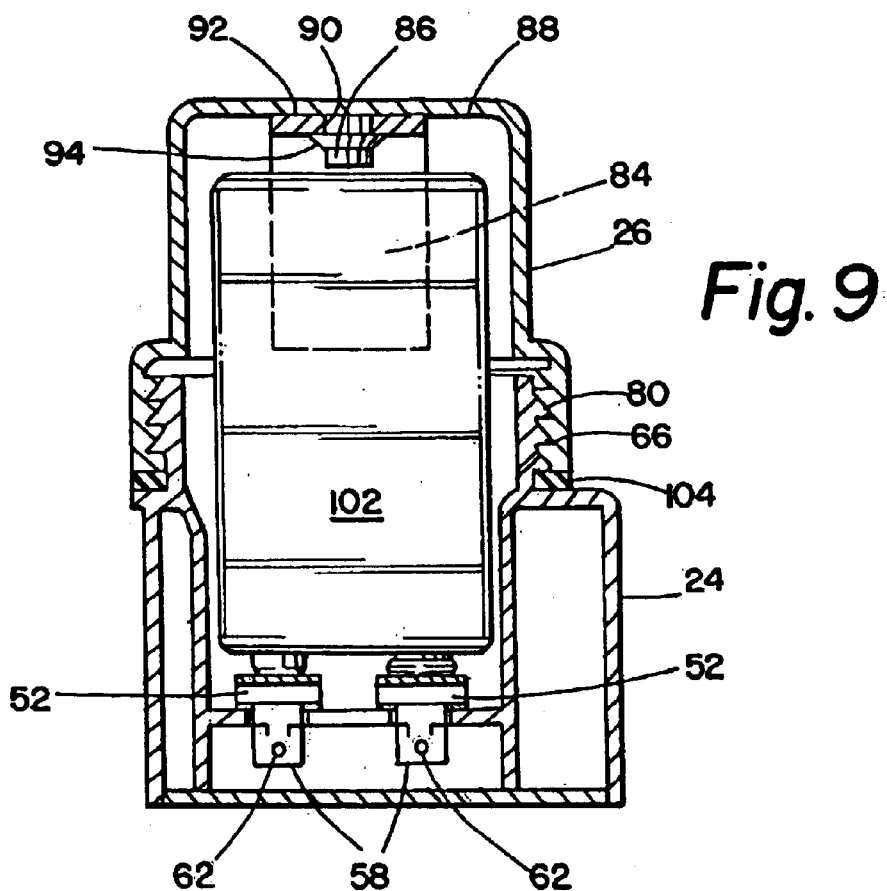
FIG. 9 is a cross-sectional view of the electronic ignition device of the present invention taken across section-indicating lines 9—9 in FIG. 4.
Figure 10:
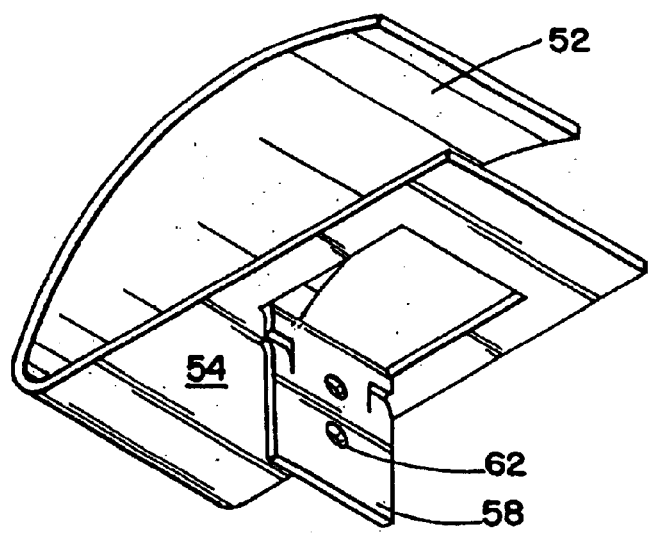
FIG. 10 is a perspective view of the electrical contact utilized within the electronic ignition device of the present invention.

Referring now to FIGS. 7–9, cross-sectional views of the ignition device 20 are illustrated. The housing 24 is provided with a recess 40 having a generally circular configuration in first portion 42 thereof and a generally rectangular configuration in second portion 44 thereof. The first portion 42 and the second portion 44 are joined together by a third portion 46 which has a generally circular inwardly tapered cone-shaped configuration. The second portion 44 terminates in a wall 48 which is generally perpendicular to both second portion 44 and first portion 42 of recess 40. Wall 48 is in a spaced apart relationship with the bottom 50 of housing 24. Two (2) generally U-shaped metallic electrical contacts 52 are received within the recess 40 and the flat portion 54 of the electrical contacts 52 contact the top surface 56 of wall 48. Each electrical contact 52 has a tab portion 58 protruding from the flat portion 54 thereof, as shown in FIG. 10, which is received through an aperture 60 provided within wall 48. An aperture 62 is provided within tab portion 58 permitting an electrical conductor 64 to be attached to tab portion 58. Male threads 66 are provided on the neck portion 68 of housing 24 which forms an entrance into the recess 40 within the housing 24.

The cap 26 is generally cylindrical in configuration and includes a female threaded portion 80 adjacent its entrance 82. The female threaded portion 80 mates with the male threads 66 provided on neck portion 68 of housing 24 when the cap 26 is threadably received on the neck portion 68 of housing 24. A generally U-shaped clip member 84 is received within the cap 26 and is rotatably mounted therein on an inwardly directed post member 86 attached to the bottom surface 88 of the cap 26. The post member 86 is received through an aperture 90 provided on the bottom surface 92 of the U-shaped clip member 84. A palnut 94 is received on post member 86 to rotatably attaching clip member 84 to cap 26. Clip member 84 includes oppositely disposed outwardly directed first portions 96 at the entrance thereto, oppositely disposed substantially parallel second portions 98 and oppositely disposed generally curved inwardly directed third portions 100 joining first portions 96 and second portions 98 of clip member 84. The distance between the oppositely disposed outwardly directed first portions 96 of clip member 84 is such so as to provide guiding surfaces to the battery 102 when it is being inserted into the clip member 84. The distance between the oppositely disposed substantially parallel second portions 98 of clip member 84 is such so as to permit the battery 102 to be received therebetween. The distance between the oppositely disposed generally curved inwardly directed third portions 100 of clip member 84 is less than the width of the battery 102 so as to apply a gripping force to the sides of the battery 102 when received within the clip member 84. An O-ring 104 is provided on neck portion 68 of housing 24 adjacent the top surface 30 of housing 24 to provide a seal between the cap 26 and the housing 24 when the cap 26 is threadably received on the neck portion 68 of housing 24. Thus, in contrast to prior art 9 volt electronic ignition devices, the electronic ignition device 20 is sealed to the environment.

In order to remove and/or replace a battery 102 within the ignition device 20, the cap 26 is threadably removed from the neck portion 68 of the housing 24. The foregoing can be readily accomplished even if the ignition device 20 is mounted on the underside of plate 22 and is not readily visible to the person replacing the battery 102. The old battery remains within the U-shaped clip member 84 as the cap 26 is removed from the housing 24 of the ignition device 20. After removal of the cap 26, the old battery can be removed from the U-shaped clip member 84 permitting a new battery to be inserted therein. When a new battery is being inserted within the U-shaped clip member 84, the oppositely disposed outwardly directed first portions 96 of the clip member 84 provide "lead-in" or guide surfaces for the battery 102. The new battery is received within the clip member 84 until its bottom surface contacts the bottom surface of the clip member 84. The oppositely disposed substantially parallel second portions 98 of the clip member 84 are deflected slightly outwardly during the battery insertion process causing the oppositely disposed generally curved inwardly directed third portions 100 of the clip member 84 to grippingly engage the sides of the new battery causing the new battery to be gripped by and retained within the clip member 84. Since the clip member 84 is rotatably mounted within the cap 26, the clip member 84 and the new battery can rotate with respect to cap 26 as a unit. The terminal end of the new battery is then inserted into the recess 40 in the housing 24 of the ignition device 20 and the inwardly tapered circular third portion 46 of the recess 40 in housing 24 guides the end of the new battery into the second portion 44 of recess 40. As the cap 26 is rotated, the female threads 80 therein engage the male threads 66 on the neck portion 68 of housing 24 causing the new battery and clip member 84 to advance within recess 40 in housing 24 until the terminals on the new battery firmly engage the electrical contacts 56. The polarity of the new battery is of no concern since the ignition device 20 contains circuitry (not shown) to compensate for the resulting polarity of the new battery with respect to the electrical contacts 52. The O-ring 104 provides a seal between the cap 26 and the housing 24 after the cap 26 has been threadably advanced on the neck portion 68 and housing 24 and has been tightened thereon.

From the foregoing, it is apparent that the 9 volt electronic ignition device 20 of the present invention provides a number of advantages over the 9 volt electronic ignition devices of the prior art. In particular, the battery 102 within the electronic ignition device 20 can be readily removed from the device 20 even if the device 20 is not visible to the person removing the battery. No tools are required in order to remove the battery—the cap 26 just has to be removed from the housing 24 of the ignition device 20. After the cap 26 has been removed, the old battery can be readily removed from the U-shaped clip 84 holding same. A new battery can then be inserted within the U-shaped clip 84 and the cap 26 can be threadably received on the neck portion 68 of housing 24 of the ignition device 20 even if the device 20 is not visible. In addition, the orientation of the battery terminals is of no concern since circuitry within the ignition device 20 compensates for battery polarity. Lastly, the ignition device 20 is sealed to the environment.

Certain modifications and improvements will occur to those skilled in the art upon reading the foregoing. It is understood that all such modifications and improvements have been deleted herein for the sake of conciseness and readability, but are properly within the scope of the following claims.

We claim:

1. An ignition device comprising a housing, a cap received on said housing, a retaining member rotatably mounted within said cap and electrical contacts within said housing, said housing having a recess provided therein, said recess having a first portion, a second portion, and a third portion interposed between said first portion and said second portion, said first portion having a generally circular configuration, said second portion having a generally rectangular configuration and said third portion having a generally circular inwardly tapered configuration.

2. The ignition device as defined in claim 1 wherein said second portion of said recess terminates in a wall that is generally perpendicular to both said second portion and said first portion of said recess, said electrical contacts engaging said wall.

3. The ignition device as defined in claim 1 wherein said housing is provided with a threaded portion at the entrance to said recess and said cap is provided with a mating threaded portion permitting the threaded engagement of said cap with said housing.

4. An ignition device comprising a housing, a cap received on said housing, a retaining member rotatably mounted within said cap and electrical contacts within said housing, said retaining member comprising oppositely disposed outwardly directed first portions at the entrance thereto, oppositely disposed substantially parallel second portions and an oppositely disposed generally curved inwardly directed third portion joining said first portion and said second portion of said retaining member.

5. The ignition device as defined in claim 4 wherein said retaining member further includes a base portion joining said oppositely disposed substantially parallel second portions.

6. The ignition device as defined in claim 5 wherein said base portion has an aperture therein permitting the rotatable mounting of said retaining member within said cap.

* * * * *